(12) United States Patent
Bunazawa et al.

(10) Patent No.: US 12,024,180 B2
(45) Date of Patent: Jul. 2, 2024

(54) ABNORMALITY DETERMINATION DEVICE (71) Applicant: TOYOTA JIDOSHA KABUSHIKI KAISHA, Toyota (JP)

(72) Inventors: Hideaki Bunazawa, Nagoya (JP); Tetsuya Yoshikawa, Toyota (JP); Kei Yuasa, Toyota (JP); Kenichi Yamaguchi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 456 days.

(21) Appl. No.: 17/381,689

(22) Filed: Jul. 21, 2021

(65) Prior Publication Data

US 2022/0041174 A1 Feb. 10, 2022

(30) Foreign Application Priority Data

Aug. 7, 2020 (JP) .................................. 2020-135299

(51) Int. Cl.
*B60W 50/02* (2012.01)
*B60W 40/105* (2012.01)
(Continued)

(52) U.S. Cl.
CPC ...... *B60W 50/0205* (2013.01); *B60W 40/105* (2013.01); *G06F 17/142* (2013.01);
(Continued)

(58) Field of Classification Search
CPC ........... B60W 50/0205; B60W 40/105; B60W 2050/0057; B60W 2050/021;
(Continued)

(56) References Cited

U.S. PATENT DOCUMENTS

| 5,744,723 A * | 4/1998 | Piety | G01P 3/48 |
| | | | 702/56 |
| 2006/0192508 A1* | 8/2006 | Albers | H02K 11/35 |
| | | | 318/128 |
| 2008/0253429 A1* | 10/2008 | Choi | F16H 61/12 |
| | | | 374/144 |
| 2010/0064814 A1* | 3/2010 | Kishino | G01M 13/028 |
| | | | 73/660 |
| 2011/0018390 A1* | 1/2011 | Guidarelli | H02N 2/02 |
| | | | 318/116 |

(Continued)

FOREIGN PATENT DOCUMENTS

| CN | 102449457 A | | 5/2012 | | |
| GB | 2392983 A | * | 3/2004 | ......... | B61L 15/0027 |
| JP | H06241880 A | * | 9/1994 | | |

(Continued)

*Primary Examiner* — Isaac G Smith
(74) *Attorney, Agent, or Firm* — Oliff PLC (57) ABSTRACT

An abnormality determination device is applied to a vehicle provided with a transmission configured to transmit power by rotation of a shaft. The abnormality determination device includes a processor and a memory. The memory configured to store mapping data that is data that defines mapping learned by machine learning. The processor is configured to execute an acquisition process and a determination process. The acquisition process is a process of acquiring a variable indicating a time-series data of a rotation speed of the shaft and using the variable as a value of an input variable of the mapping. The determination process is a process of determining whether an abnormality has occurred in the transmission based on a value of the output variable acquired using the value of the input variable and the mapping.

10 Claims, 5 Drawing Sheets

| y(0) | NO ABNORMALITY (NORMAL) |
| y(1) | DIVERGENT VIBRATION |
| y(2) | TORSIONAL VIBRATION |
| y(3) | BENDING VIBRATION |

(51) Int. Cl.
*G06F 17/14* (2006.01)
*G06N 20/00* (2019.01)
*B60W 50/00* (2006.01)

(52) U.S. Cl.
CPC ..... *G06N 20/00* (2019.01); *B60W 2050/0057* (2013.01); *B60W 2050/021* (2013.01); *B60W 2510/0657* (2013.01); *B60W 2510/1015* (2013.01); *B60W 2530/13* (2021.08)

(58) Field of Classification Search
CPC ............ B60W 2510/0657; B60W 2510/1015; B60W 2530/13; G06F 17/142
USPC ....................................................... 701/33.6
See application file for complete search history.

(56) References Cited

U.S. PATENT DOCUMENTS

| | | | |
|---|---|---|---|
| 2019/0310281 A1* | 10/2019 | Hayzen | ................ G01H 1/003 |
| 2021/0088418 A1* | 3/2021 | Sato | .................... G01M 13/045 |
| 2023/0081892 A1* | 3/2023 | Nozuki | ............. G05B 23/0221 |
| | | | 702/183 |

FOREIGN PATENT DOCUMENTS

| | | | | | |
|---|---|---|---|---|---|
| JP | 2002286542 | A | * | 10/2002 | |
| JP | 2009-063455 | A | | 3/2009 | |
| JP | 2010027076 | A | * | 2/2010 | ............ G05B 23/02 |
| JP | 2017214862 | A | * | 12/2017 | |
| KR | 20140021089 | A | * | 2/2014 | |
| RU | 2567017 | C2 | * | 10/2015 | |
| WO | 2010/114735 | A2 | | 10/2010 | |

\* cited by examiner

| y(0) | NO ABNORMALITY (NORMAL) |
|---|---|
| y(1) | DIVERGENT VIBRATION |
| y(2) | TORSIONAL VIBRATION |
| y(3) | BENDING VIBRATION |

ABNORMALITY DETERMINATION DEVICE

CROSS-REFERENCE TO RELATED APPLICATION

This application claims priority to Japanese Patent Application No. 2020-135299 filed on Aug. 7, 2020, incorporated herein by reference in its entirety.

BACKGROUND

1. Technical Field

The present disclosure relates to an abnormality determination device that determines whether an abnormality has occurred in a transmission that transmits power by rotation of a shaft.

2. Description of Related Art

Japanese Unexamined Patent Application Publication No. 2009-63455 (JP 2009-63455 A) discloses a detection device that detects an abnormality based on whether the detected value is in the normal region or the abnormal region.

SUMMARY

As an abnormality determination device, there is a need to grasp not only whether an abnormality has occurred, but also the phenomenon that causes the abnormality. For example, when the object to be inspected vibrates due to an abnormality, it is presumed that the state of the object to be inspected differs depending on the vibration mode. That is, if the vibration mode can be specified, the state of the object to be inspected can be determined, which helps to grasp the actual state of the phenomenon. When making a determination with the detection device disclosed in JP 2009-63455 A, it is possible to detect whether an abnormality has occurred, but it is not possible to determine the state of the object to be inspected.

An abnormality determination device according to a first aspect of the present disclosure is applied to a vehicle provided with a transmission configured to transmit power by rotation of a shaft. The abnormality determination device includes a processor and a memory. The memory configured to store mapping data that is data that defines mapping learned by machine learning. The mapping is a mapping that an input variable is a variable indicating time-series data of a rotation speed of the shaft and that an output variable is a variable indicating a state of the shaft. The processor is configured to execute an acquisition process of acquiring the variable indicating the time-series data and using the variable as a value of the input variable, and a determination process of determining whether an abnormality has occurred in the transmission based on a value of the output variable acquired using the value of the input variable and the mapping.

An abnormality may occur in the transmission and the shaft that transmits power may vibrate. When the shaft is in a vibration state, it can be inferred that the time-series data of the rotation speed of the shaft shows different features from the time-series data when the shaft is not in a vibration state. Further, it can be inferred that the features shown by the time-series data differ depending on the vibration mode of the shaft.

According to the above configuration, when a variable indicating the time-series data of the rotation speed of the shaft is input to the mapping, a state variable that is a variable indicating the state of the shaft is output. Thereby, the state of the shaft can be determined based on the variable indicating the time-series data of the rotation speed of the shaft. That is, based on the time-series data of the rotation speed of the shaft, it is possible to determine the state of the shaft by extracting features that cannot be grasped only from the magnitude of the rotation speed of the shaft, and it can be determined whether an abnormality has occurred in the transmission.

In the above aspect, the processor may be configured to execute a feature quantity calculation process of calculating a feature quantity obtained by processing the time-series data, the acquisition process may be a process of acquiring the feature quantity and using the feature quantity as the value of the input variable, and the feature quantity calculation process may be a process of dividing values of the rotation speed constituting the time-series data into classes in accordance with a magnitude of the rotation speed, and calculating an incidence for each of the classes as the feature quantity.

In the above configuration, the time-series data of the rotation speed is processed into a feature quantity showing an incidence distribution. This makes it easy to distinguish the feature indicated by the time-series data of the rotation speed when an abnormality has occurred in the shaft from the feature indicated by the time-series data of the rotation speed when no abnormality has occurred in the shaft. That is, the accuracy of determining the state of the shaft can be improved.

In the above aspect, the feature quantity calculation process may include a process of normalizing the time-series data such that a maximum value of the rotation speed becomes "1" and a minimum value of the rotation speed becomes "0".

According to the above configuration, by normalizing the time-series data, the fluctuation of the rotation speed can be grasped as a feature indicated by the time-series data to determine the state of the shaft without being affected by the magnitude of the absolute value of the rotation speed.

In the above aspect, the feature quantity may be a time feature quantity, the feature quantity calculation process may be an incidence analysis process of calculating the time feature quantity, the processor may be configured to execute a frequency analysis process of calculating, as a frequency feature quantity, a distribution of frequency components obtained by fast Fourier transforming the time-series data, and in the acquisition process, the time feature quantity and the frequency feature quantity obtained by processing the time-series data may be acquired and used as the value of the input variable.

In the above configuration, the time feature quantity in which the time-series data is processed into a feature quantity showing an incidence distribution and a frequency feature quantity in which the time-series data is converted from the time domain to the frequency domain are calculated and input to the mapping. By inputting a combination of data that has been processed differently into the mapping, it becomes easier to distinguish the features indicated by the time-series data, and thus it can be expected that the accuracy of the determination will be further improved.

In the above aspect, the processor may be configured to execute a frequency analysis process of calculating a frequency feature quantity obtained by processing the time-series data, the acquisition process may be a process of acquiring the frequency feature quantity and using the frequency feature quantity as the value of the input variable, and the frequency analysis process may be a process of calculating, as the frequency feature quantity, a distribution of frequency components obtained by fast Fourier transforming the time-series data.

In the above configuration, the time-series data of the rotation speed is processed into the feature quantity converted from the time domain to the frequency domain. Determining the state of the shaft based on the features of the time-series data appearing in the frequency domain makes it easy to distinguish the feature indicated by the time-series data of the rotation speed when an abnormality has occurred in the shaft from the feature indicated by the time-series data of the rotation speed when no abnormality has occurred in the shaft. That is, the accuracy of determining the state of the shaft can be improved.

In the above aspect, the frequency analysis process may include a process of calculating a primary frequency based on an average of the rotation speed in the time-series data and normalizing the frequency components with the primary frequency as a reference.

According to the above configuration, by normalizing the frequency components, the state of the shaft can be determined based on the features indicated by the time-series data of the rotation speed without being affected by the intensity of the frequency components.

In the above aspect, the frequency analysis process may include a process of normalizing the frequency components such that an intensity of the frequency components at a primary resonance frequency when a vibration mode of the shaft is torsional vibration becomes "1".

When the vibration of the shaft is subdivided, there are multiple vibration modes. In the data in the state where the vibration mode is torsional vibration and resonance is generated, the intensity of the frequency components at the resonance frequency when the vibration mode is torsional vibration is relatively higher than the intensity at other frequencies. Therefore, when the data in the state where the torsional vibration is generated is input and normalized as described above, the high intensities of the frequency components at the primary, secondary, . . . nth-order resonance frequencies are emphasized. On the other hand, in the data in the state where no torsional vibration is generated, it can be presumed that the difference between the intensity at the resonance frequency when the vibration mode is torsional vibration and the intensity at other frequencies is not large. Therefore, when the data in the state where the torsional vibration is not generated is normalized as described above, it is presumed that the distribution shows a large incidence in the entire frequency domain.

That is, according to the above configuration, the difference in the features that can be extracted from the time-series data of the rotation speed depending on whether the shaft vibration mode is torsional vibration or is not torsional vibration can be made remarkable. This makes it easier to distinguish the state of the shaft.

In the above aspect, the frequency analysis process may include a process of normalizing the frequency components such that an intensity of the frequency components at a primary resonance frequency when a vibration mode of the shaft is bending vibration becomes "1".

When the vibration of the shaft is subdivided, there are multiple vibration modes. In the data in the state where the vibration mode is bending vibration and resonance is generated, the intensity of the frequency components at the resonance frequency when the vibration mode is bending vibration is relatively higher than the intensity at other frequencies. Therefore, when the data in the state where the bending vibration is generated is input and normalized as described above, the high intensities of the frequency components at the primary, secondary, . . . nth-order resonance frequencies are emphasized. On the other hand, in the data in the state where no bending vibration is generated, it can be presumed that the difference between the intensity at the resonance frequency when the vibration mode is bending vibration and the intensity at other frequencies is not large. Therefore, when the data in the state where the bending vibration is not generated is normalized as described above, it is presumed that the distribution shows a large incidence in the entire frequency domain.

That is, according to the above configuration, the difference in the features that can be extracted from the time-series data of the rotation speed depending on whether the shaft vibration mode is bending vibration or is not bending vibration can be made remarkable. This makes it easier to distinguish the state of the shaft.

In the above aspect, the time-series data may be calculated based on a detection signal of a rotation speed sensor that detects the rotation speed of the shaft. In the above aspect, the time-series data may be calculated based on a vehicle speed of the vehicle.

In the above aspect, the input variable may include a variable indicating a temperature of hydraulic oil in the transmission. According to the above configuration, in addition to the variable indicating the time-series data, the variable indicating the temperature of the hydraulic oil is input to the mapping as an input variable. By inputting different types of variables, it is possible to improve the accuracy of determining whether an abnormality has occurred in the transmission.

In the above aspect, the input variable may include a variable indicating a magnitude of torque transmitted by the shaft. According to the above configuration, it is possible to improve the accuracy of determining whether an abnormality has occurred in the transmission.

In the above aspect, the input variable may include a variable indicating a dimension of the shaft based on specifications of the shaft. According to the above configuration, it is possible to improve the accuracy of determining whether an abnormality has occurred in the transmission.

In the above aspect, the input variable may include a variable indicating an unbalance amount of the shaft. According to the above configuration, it is possible to improve the accuracy of determining whether an abnormality has occurred in the transmission.

In the above aspect, the input variable may include a variable indicating a fitting tolerance between the shaft and a bearing of the shaft. According to the above configuration, it is possible to improve the accuracy of determining whether an abnormality has occurred in the transmission.

In the above aspect, the input variable may include a variable indicating a coaxiality between the shaft and a bearing of the shaft. According to the above configuration, it is possible to improve the accuracy of determining whether an abnormality has occurred in the transmission.

In the above aspect, the input variable may include a variable indicating a value detected by a vibration sensor configured to detect vibration. According to the above configuration, it is possible to improve the accuracy of determining whether an abnormality has occurred in the transmission.

In the above aspect, the input variable may include a variable indicating a value detected by a noise sensor configured to detect noise. According to the above configuration, it is possible to improve the accuracy of determining whether an abnormality has occurred in the transmission.

In the above aspect, the input variable may include a variable indicating a hydraulic pressure in a braking device of the vehicle. According to the above configuration, it is possible to improve the accuracy of determining whether an abnormality has occurred in the transmission.

In the above aspect, the input variable may include a variable indicating a mileage of the vehicle. According to the above configuration, it is possible to improve the accuracy of determining whether an abnormality has occurred in the transmission.

In the above aspect, the state variable may include a variable indicating that the shaft is in a divergent vibration state. When the shaft is in a divergent vibration state, features peculiar to the divergent vibration appear in the time-series data. According to the above configuration, when a variable indicating the time-series data having features peculiar to the divergent vibration is input to the mapping, a state variable indicating that the shaft is in a divergent vibration state can be output. That is, the divergent vibration of the shaft can be detected based on the features indicated by the time-series data.

In the above aspect, the state variable may include a variable indicating that the shaft is in a torsional vibration state. When the shaft is in a torsional vibration state, features peculiar to the torsional vibration appear in the time-series data. According to the above configuration, when a variable indicating the time-series data having features peculiar to the torsional vibration is input to the mapping, a state variable indicating that the shaft is in a torsional vibration state can be output. That is, the torsional vibration of the shaft can be detected based on the features indicated by the time-series data. Thereby, the vibration mode can be classified and the state of the shaft can be determined.

In the above aspect, the state variable may include a variable indicating that the shaft is in a bending vibration state. When the shaft is in a bending vibration state, features peculiar to the bending vibration appear in the time-series data. According to the above configuration, when a variable indicating the time-series data having features peculiar to the bending vibration is input to the mapping, a state variable indicating that the shaft is in a bending vibration state can be output. That is, the bending vibration of the shaft can be detected based on the features indicated by the time-series data. Thereby, the vibration mode can be classified and the state of the shaft can be determined.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
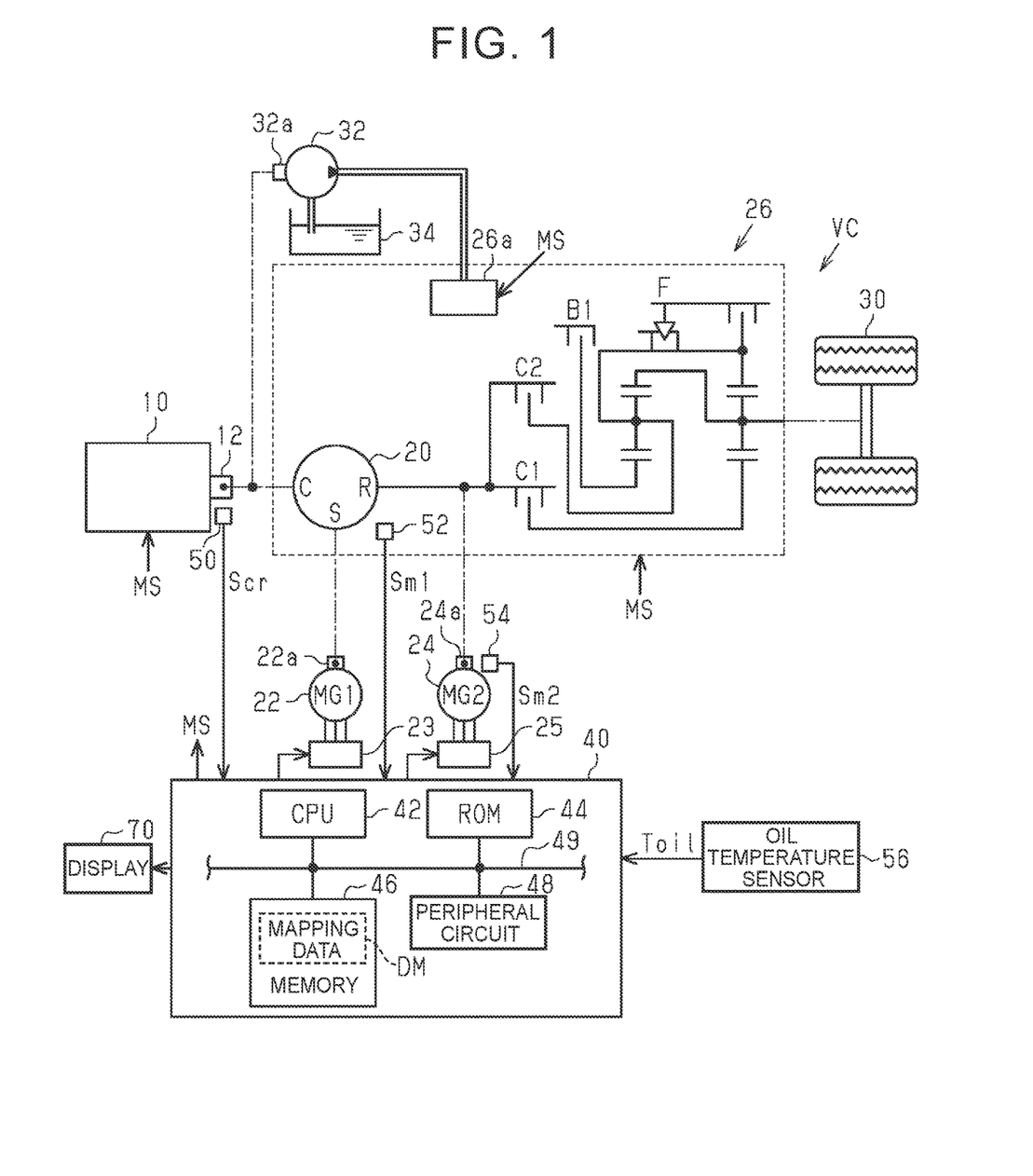
FIG. 1 is a diagram showing a configuration of a vehicle and a control device according to an embodiment.

Hereinafter, an embodiment of an abnormality determination device will be described with reference to the drawings. As shown in FIG. 1, a vehicle VC includes an internal combustion engine 10, a first motor generator 22, and a second motor generator 24. A power split device 20 is mechanically connected to a crankshaft 12 of the internal combustion engine 10. The power split device 20 divides the power of the internal combustion engine 10, the first motor generator 22, and the second motor generator 24. The power split device 20 includes a planetary gear mechanism. A carrier C of the planetary gear mechanism is mechanically connected to the crankshaft 12. A sun gear S of the planetary gear mechanism is mechanically connected to a rotation shaft 22a of the first motor generator 22. A ring gear R of the planetary gear mechanism is mechanically connected to a rotation shaft 24a of the second motor generator 24. The output voltage of a first inverter 23 is applied to the terminal of the first motor generator 22. The output voltage of a second inverter 25 is applied to the terminal of the second motor generator 24.

In addition to the rotation shaft 24a of the second motor generator 24, drive wheels 30 are mechanically connected to the ring gear R of the power split device 20 via a transmission 26. The transmission 26 includes a shaft that is a rotation shaft that transmits power. The shaft is supported by bearings so as to be rotatable.

A driven shaft 32a of an oil pump 32 is mechanically connected to the carrier C of the power split device 20. The oil pump 32 is a pump that circulates oil in an oil pan 34 as lubricating oil to the power split device 20 and discharges the oil to the transmission 26 as hydraulic oil. The pressure of the hydraulic oil discharged from the oil pump 32 is adjusted by a hydraulic control circuit 26a in the transmission 26 to be used as the hydraulic oil.

A control device 40 controls the internal combustion engine 10. A control device 40 operates various operation units of the internal combustion engine 10 in order to control torque, an exhaust component ratio, and the like, which are control amounts of the internal combustion engine 10. Further, the control device 40 controls the first motor generator 22. The control device 40 operates the first inverter 23 in order to control torque, rotation speed, and the like, which are control amounts of the first motor generator 22. Further, the control device 40 controls the second motor generator 24. The control device 40 operates the second inverter 25 in order to control torque, rotation speed, and the like, which are control amounts of the second motor generator 24. In FIG. 1, signals transmitted by the control device 40 for operating the internal combustion engine 10 and the transmission 26 are indicated as operation signals MS.

When the control device 40 controls the above control amounts, the control device 40 references the output signal Scr of a crank angle sensor 50, the output signal Sm1 of a first rotation angle sensor 52 that detects the rotation angle of the rotation shaft 22a of the first motor generator 22, and the output signal Sm2 of a second rotation angle sensor 54 that detects the rotation angle of the rotation shaft 24a of the second motor generator 24. Further, the control device 40 references the oil temperature Toil that is the temperature of the oil detected by an oil temperature sensor 56.

The control device 40 includes a central processing unit (CPU) 42, a read only memory (ROM) 44, a memory 46 that is an electrically rewritable non-volatile memory, and a peripheral circuit 48. The CPU 42, the ROM 44, the memory 46 that is an electrically rewritable non-volatile memory, and the peripheral circuit 48 can communicate with each other via a local network 49. Here, the peripheral circuit 48 includes a circuit that generates a clock signal that defines the internal operation, a power supply circuit, a reset circuit, and the like. The control device 40 controls the control amounts when the CPU 42 executes the program stored in the ROM 44.

A part of the processes executed by the control device 40 will be described. The control device 40 executes a drive torque setting process. The drive torque setting process is a process of calculating a drive torque command value Trq* that is a command value of torque to be applied to the drive wheels 30. The drive torque command value Trq* is calculated by inputting the operation amount of an accelerator operation member provided in the vehicle VC as an input, and increases as the operation amount increases.

The control device 40 executes a drive force distribution process. The drive force distribution process is a process of setting, based on the drive torque command value Trq*, the torque command value Trqe* for the internal combustion engine 10, the torque command value Trqm1* for the first motor generator 22, and the torque command value Trqm2* for the second motor generator 24. These torque command values Trqe*, Trqm1*, and Trqm2* are generated by the internal combustion engine 10, the first motor generator 22, and the second motor generator 24, respectively, so that the torque applied to the drive wheels 30 is set to the drive torque command value Trq*.

The control device 40 executes a rotation speed calculation process. The rotation speed calculation process is a process of calculating the shaft rotation speed Nshaft as the rotation speed of the shaft mounted on the transmission 26. The shaft rotation speed Nshaft is calculated based on the output signal Sm1. The shaft rotation speed Nshaft is calculated every predetermined period. The transition of the shaft rotation speed Nshaft is stored in the memory 46 as time-series data of the shaft rotation speed Nshaft.

Figure 2:
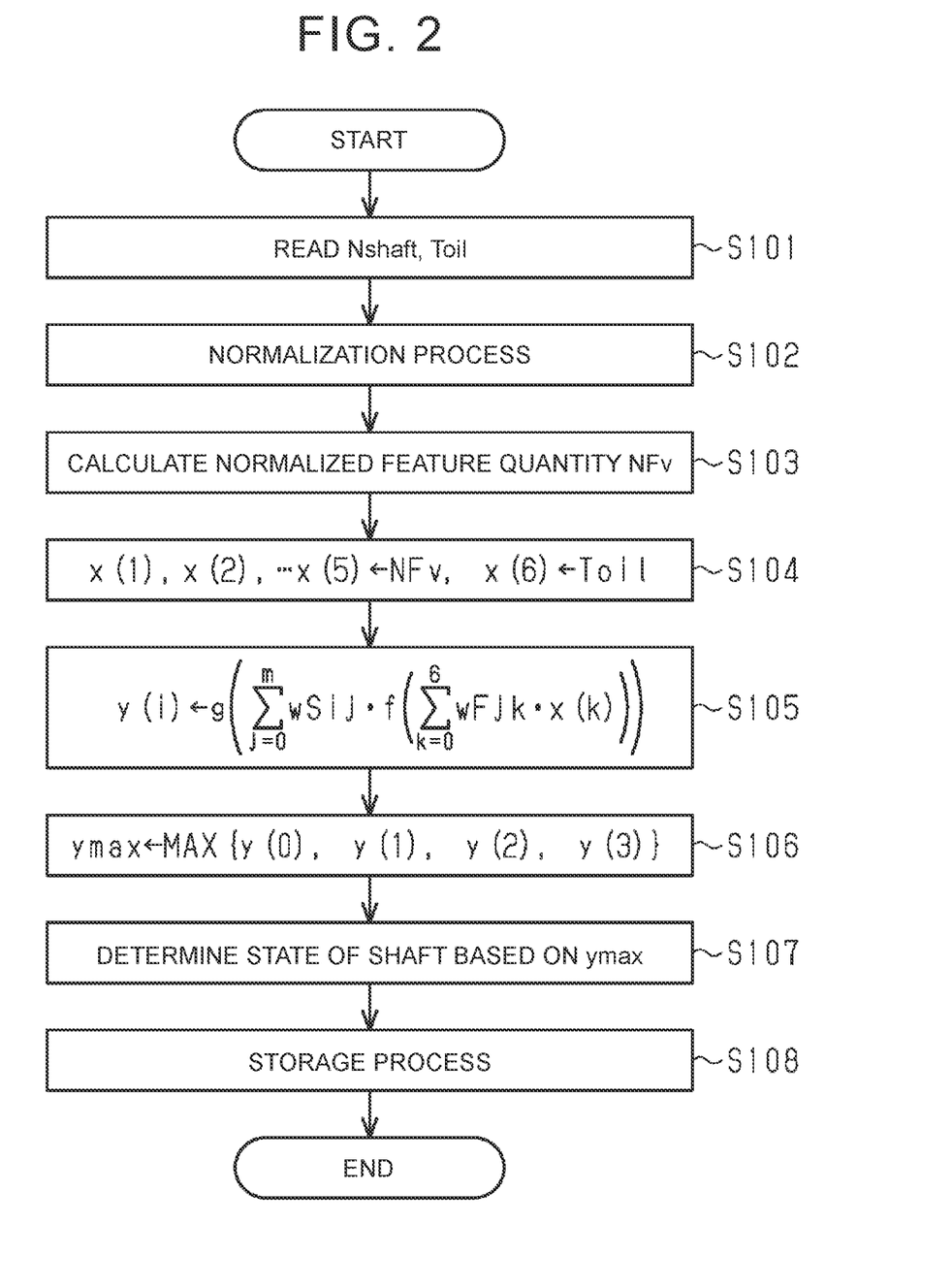
FIG. 2 is a flowchart showing a procedure of a process executed by the control device according to the embodiment.

The control device 40 executes a process for determining an abnormality in the shaft of the transmission 26. Hereinafter, this process will be described. FIG. 2 shows a procedure of the process executed by the control device 40. The process shown in FIG. 2 is realized when the CPU 42 repeatedly executes the program stored in the ROM 44, for example, at a predetermined cycle. Note that, in the following, the step number of each process is represented by a number with "S" added at the beginning.

In the series of processes shown in FIG. 2, the CPU 42 first acquires the time-series data of the shaft rotation speed Nshaft and the oil temperature Toil (S101). Next, the CPU 42 executes a normalization process for normalizing the time-series data of the shaft rotation speed Nshaft in the specified period (S102). The CPU 42 further calculates the normalized feature quantity NFv obtained by processing the normalized time-series data (S103). The normalized feature quantity NFv is calculated as data representing the incidence distribution of the shaft rotation speed Nshaft in the specified period.

Figure 3:
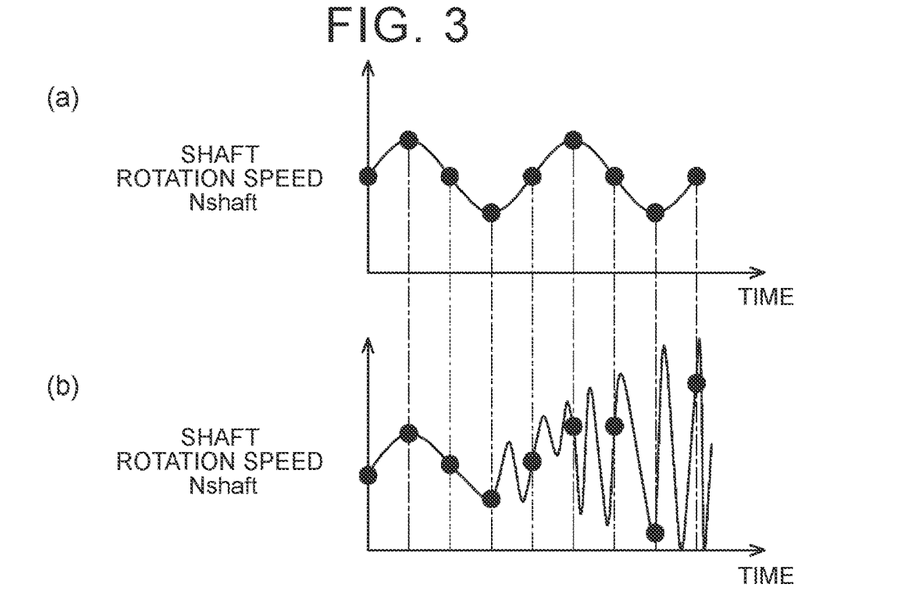
FIG. 3 is a diagram showing time-series data of the rotation speed of a shaft according to the embodiment.

The processes of S102 and S103 will be described with reference to FIGS. 3, 4A, and 4B. Portion (a) in FIG. 3 illustrates a part of the time-series data of the shaft rotation speed Nshaft when abnormal vibration has not occurred in the shaft, that is, when the shaft is in a normal state. Portion (b) in FIG. 3 illustrates a part of the time-series data of the shaft rotation speed Nshaft when the shaft is in a divergent vibration state, that is, when an abnormality has occurred in the shaft. In the portions (a) and (b) in FIG. 3, it is assumed that the magnitude of the drive torque command value Trq* is equal in the period that is illustrated.

As shown in the portion (a) in FIG. 3, when no abnormality has occurred in the shaft, the shaft rotation speed Nshaft transitions with a regular cycle and amplitude. On the other hand, as shown in the portion (b) in FIG. 3, when an abnormality has occurred in the shaft, the shaft rotation speed Nshaft transitions to indicate a different waveform from the waveform shown in the portion (a) in FIG. 3. In particular, the portion (b) in FIG. 3 shows an example in which the shaft is in a divergent vibration state, so that the amplitude of the shaft rotation speed Nshaft increases as time elapses. As described above, when abnormal vibration has occurred in the shaft, the value of the shaft rotation speed Nshaft may become extremely large or extremely small. Further, when abnormal vibration has occurred in the shaft, the transition of the shaft rotation speed Nshaft differs depending on the vibration mode of the shaft.

In the present embodiment, the time-series data of the shaft rotation speed Nshaft is configured by a plurality of sampling values that is continuous in time series when the shaft rotation speed Nshaft in a specified period is sampled at a constant sampling cycle. The circles in FIG. 3 illustrate the sampling values sampled at a constant sampling cycle. The period for sampling the shaft rotation speed Nshaft is the specified period.

In the process of S102, the CPU 42 normalizes the time-series data of the shaft rotation speed Nshaft so that the maximum value of the shaft rotation speed Nshaft in the specified period becomes "1" and the minimum value of the shaft rotation speed Nshaft in the specified period becomes "0". For example, normalization can be performed based on the following mathematical formula (Equation 1).

$$N=(n-n\text{min})/(n\text{max}-n\text{min}) \quad \text{(Equation 1)}$$

In the above mathematical formula (Equation 1), "N" is the shaft rotation speed Nshaft after normalization, "n" is the shaft rotation speed Nshaft to be normalized, "nmax" is the maximum value of the shaft rotation speed Nshaft before normalization, and "nmin" is the minimum value of the shaft rotation speed Nshaft before normalization.

In the process of S103, the CPU 42 first divides the range from the minimum value to the maximum value of the shaft rotation speed Nshaft in the specified period into five equal ranges and classifies the ranges into five classes. In other words, the classification is performed so that the width of each class is "0.2". Then, the CPU 42 calculates the number of sampling values of the shaft rotation speed Nshaft in each class, that is, the incidence as the normalized feature quantity NFv. Hereinafter, the five classes are referred to as the first class Bin1, the second class Bin2, the third class Bin3, the fourth class Bin4, and the fifth class Bin5 in order from the smallest.

Figure 4A:
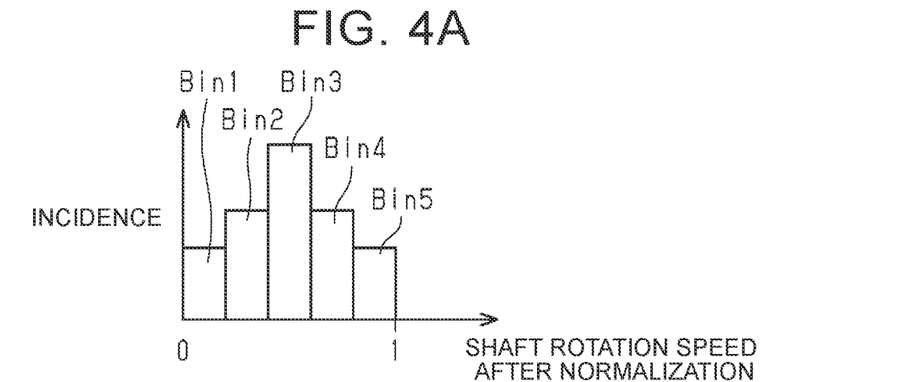
FIG. 4A is a diagram showing feature quantities obtained by processing the time-series data of the rotation speed of the shaft according to the embodiment.

FIG. 4A is an example in which the processes of S102 and S103 are applied to the time-series data of the shaft rotation speed Nshaft when no abnormality has occurred in the shaft. That is, FIG. 4A shows an example of a normalized feature quantity NFv when no abnormality has occurred in the shaft. As shown in FIG. 4A, when no abnormality has occurred in the shaft, the incidence increases in the order of the incidence in the first class Bin1, the incidence in the second class Bin2, and the incidence in the third class Bin3. Among the incidences in the five classes, the incidence in the third class Bin3 including the median of the shaft rotation speed Nshaft is the highest, and the incidence in the fourth class Bin4 and the incidence in the fifth class Bin5 decrease in this order. Further, the incidence in the second class Bin2 and the incidence in the fourth class Bin4 are equal, and the incidence in the first class Bin1 and the incidence in the fifth class Bin5 are equal. That is, FIG. 4A shows a symmetrical distribution centered on the third class Bin3.

Figure 4B:
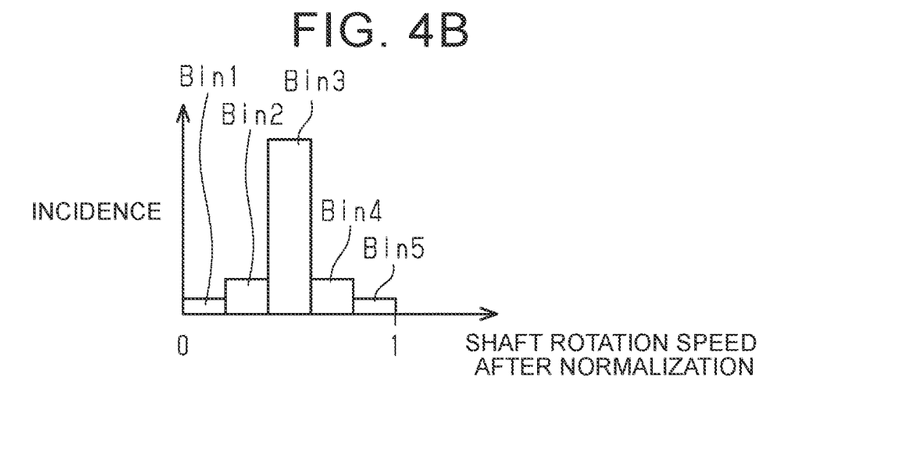
FIG. 4B is a diagram showing feature quantities obtained by processing the time-series data of the rotation speed of the shaft according to the embodiment.

FIG. 4B is an example in which the processes of S102 and S103 are applied to the time-series data of the shaft rotation speed Nshaft when an abnormality has occurred in the shaft. That is, FIG. 4B shows an example of a normalized feature quantity NFv when an abnormality has occurred in the shaft. Similar to FIG. 4A, the incidence in the third class Bin3 is the highest, and the incidence in the first class Bin1 and the incidence in the fifth class Bin5 are the lowest. However, unlike FIG. 4A in which no abnormality has occurred in the shaft, the incidence in the third class Bin3 is extremely larger as compared with the incidences in the other classes. This is because a small number of values far from the median is sampled due to irregular fluctuations in the shaft rotation speed Nshaft. To explain in more detail, the incidence distribution of data in which a small number of values far from the median is sampled is considered. The range from the minimum value to the maximum value of the shaft rotation speed Nshaft in the data is divided into the same number of classes as in the example shown in FIG. 4A in which the time-series data of the shaft rotation speed Nshaft that transitions regularly is processed. As a result, the class including the mode contains more samples than in the example shown in FIG. 4A. Thus, when a small number of values far from the median is sampled, the incidence of the class including the mode becomes higher, while the incidences of the other classes become lower.

As shown in FIGS. 4A and 4B, the normalized feature quantity NFv obtained by processing the time-series data of the shaft rotation speed Nshaft shows different features between a case where no abnormality has occurred in the shaft and a case where the shaft is in a vibration state. Further, when the shaft is in a vibration state, the features indicated by the normalized feature quantity NFv differ depending on the vibration mode.

Returning to FIG. 2, after calculating the normalized feature quantity NFv, the CPU 42 substitutes the normalized feature quantity NFv calculated by the process of S103 and the oil temperature Toil into the input variables $x(1)$ to $x(6)$ for the mapping defined by the mapping data DM stored in the memory 46 shown in FIG. 1 (S104). More specifically, the incidence of the first class Bin1 to the incidence of the fifth class Bin5 are substituted into the input variables $x(1)$ to $x(5)$, respectively. The oil temperature Toil is substituted into the input variable $x(6)$. Here, the average of the oil temperature Toil in the specified period can be substituted into the input variable $x(6)$.

Next, the CPU 42 substitutes the values of the input variables $x(1)$ to $x(6)$ into the mapping to calculate the values of the output variables $y(0)$ to $y(4)$ that are variables indicating the state of the shaft (S105).

In the present embodiment, a function approximator is exemplified as the mapping, and more specifically, a fully connected forward propagation type neural network having one intermediate layer is exemplified. Specifically, the values of the nodes in the intermediate layer are determined by substituting, into the activation function f, each of the "m" values of the input variables $x(1)$ to $x(6)$ into which the values are substituted in the process of S105 and the input variable $x(0)$ serving as a bias parameter, which are converted by the linear mapping defined by the coefficient wFjk (j=1 to m, k=0 to 6). Further, the values of the output variables $y(0)$, $y(1)$, $y(2)$, and $y(3)$ are determined by substituting, into the activation function g, each of the values obtained by converting each of the values of the nodes in the intermediate layer by the linear mapping defined by the coefficient wSij (i=0 to 3). As the activation function f, a hyperbolic tangent or the like can be adopted. As the activation function g, a softmax function can be adopted.

Figure 5:
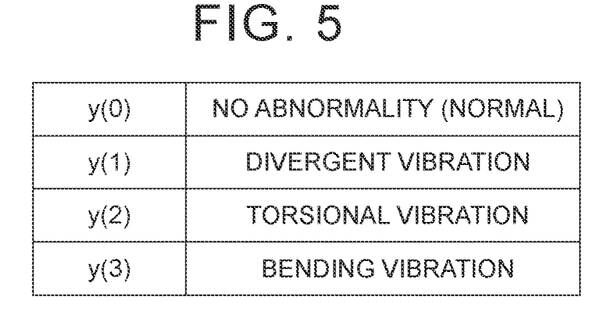
FIG. 5 is a diagram defining output variables according to the embodiment.

As shown in FIG. 5, the output variables $y(0)$, $y(1)$, $y(2)$, and $y(3)$ are state variables that specify the state of the shaft. The output variable $y(0)$ indicates the probability that the shaft is not in an abnormal vibration state, that is, the shaft is in a normal state. The output variable $y(1)$ indicates the probability that the shaft is in a divergent vibration state. The output variable $y(2)$ indicates the probability that the shaft is in a torsional vibration state. The output variable $y(3)$ indicates the probability that the shaft is in a bending vibration state.

Returning to FIG. 2, the CPU 42 selects the maximum value ymax among the output variables $y(0)$ to $y(3)$ (S106). Then, the CPU 42 determines the state of the shaft based on the output variable equal to the maximum value ymax of the output variables $y(0)$ to $y(3)$ (S107). Next, the CPU 42 executes a storage process of storing the result of determining the state of the shaft in the memory 46 (S108). For example, when the value of the output variable $y(1)$ is equal to the maximum value ymax, the CPU 42 stores in the memory 46 that the shaft is in a divergent vibration state. In the process of S108, the CPU 42 can also operate a display 70 shown in FIG. 1 to execute a notification process for notifying the state of the transmission 26 based on the state of the shaft stored in the memory 46. The display 70 is an example of a notification device that notifies the state of the transmission 26. For example, the notification process may be executed by using a speaker as the notification device and operating the speaker to output an audio signal. When the process of S108 is completed, the CPU 42 temporarily ends the series of processes shown in FIG. 2.

The mapping data DM is a pre-learned model. For the learning of the mapping data DM, the teacher data is used in which the data indicating the actual state of the shaft is labeled as the correct answer for the normalized feature quantity NFv and the oil temperature Toil. The normalized feature quantity NFv in the teacher data is a value calculated by the same processes as the processes of S102 and S103 based on the time-series data of the shaft rotation speed Nshaft obtained by driving a prototype vehicle or the like. The mapping data DM is learned using the teacher data including data when the shaft is in a normal state, data when the shaft is in a divergent vibration state, data when the shaft is in a torsional vibration state, and data when the shaft is in a bending vibration state.

Here, the operation and effect of the present embodiment will be described. The CPU 42 determines the state of the shaft based on the time-series data of the shaft rotation speed Nshaft. By referencing the time-series data of the shaft rotation speed Nshaft in this way, it is possible to determine whether an abnormality has occurred in the transmission 26.

According to the present embodiment described above, the operations and effects described below can be further obtained.

(1) The normalized feature quantity NFv calculated by processing the time-series data of the shaft rotation speed Nshaft is used as the input variables for the mapping. Processing the time-series data into data representing the incidence distribution as shown in FIGS. 4A and 4B makes it easy to distinguish the feature indicated by the time-series data of the shaft rotation speed Nshaft when an abnormality has occurred in the shaft from the feature indicated by the time-series data of the shaft rotation speed Nshaft when no abnormality has occurred in the shaft. That is, the accuracy of distinguishing the state of the shaft can be improved, and thus the accuracy of determining whether an abnormality has occurred in the transmission 26 can be improved.

(2) When the time-series data of the shaft rotation speed Nshaft is processed into the normalized feature quantity NFv, the shaft rotation speed Nshaft is classified into classes. Therefore, the order of the input variables can be reduced. As a result, it is possible to reduce the calculation load of the process for determining the abnormality of the shaft.

(3) Since the time-series data of the shaft rotation speed Nshaft is normalized into the normalized feature quantity NFv, the fluctuation of the shaft rotation speed Nshaft can be grasped as a feature indicated by the time-series data to determine the state of the shaft without being affected by the magnitude of the absolute value of the shaft rotation speed Nshaft.

(4) In addition to the normalized feature quantity NFv, the average of the oil temperature Toil in the specified period is included in the input variables input to the mapping at one time. As a result, the values of the state variables can be calculated in consideration of the temperature of the oil. By inputting different types of variables, the accuracy of determining the state of the shaft can be improved.

(5) After calculating the values of the output variables y(0) to y(3), the CPU 42 determines the state of the shaft based on the maximum value among the output variables y(0) to y(3), and stores the state of the shaft in the memory 46. This enables specifying not only whether an abnormality has occurred in the shaft, but also the state of the shaft when an abnormality has occurred in the shaft. In other words, it is possible to detect that the shaft is in a divergent vibration state, the shaft is in a torsional vibration state, or the shaft is in a bending vibration state.

(6) Since the result of determining the state of the shaft is stored in the memory 46, when the vehicle VC is brought to the repair shop, measures can be taken according to the cause of the abnormality stored in the memory 46.

(7) At the initial time when an abnormality occurs in the transmission 26 and the shaft starts to vibrate, there is a possibility that the transmission 26 has not reached the stage where its performance is deteriorated. By determining the state of the shaft based on the changes appearing in the time-series data of the shaft rotation speed Nshaft, it is possible to detect that the shaft has started abnormal vibration. In other words, the abnormality can be detected before the performance of the transmission 26 is deteriorated.

Correspondence

An example of the abnormality determination device is the control device 40 in FIG. 1. An example of the processor is the CPU 42 and the ROM 44 in FIG. 1. An example of the memory is the memory 46 in FIG. 1. An example of the mapping data is the mapping data DM. An example of the acquisition process is the process of S104 in FIG. 2. An example of the determination process is the processes of S105 to S107 in FIG. 2. An example of the feature quantity calculation process is the processes of S102 and S103 in FIG. 2.

Other Embodiments

The above embodiment can be modified to be carried out as follows. The above embodiment and modified examples described below may be carried out in combination within a technically consistent range.

About Value Referenced by Control Device

Figure 8:
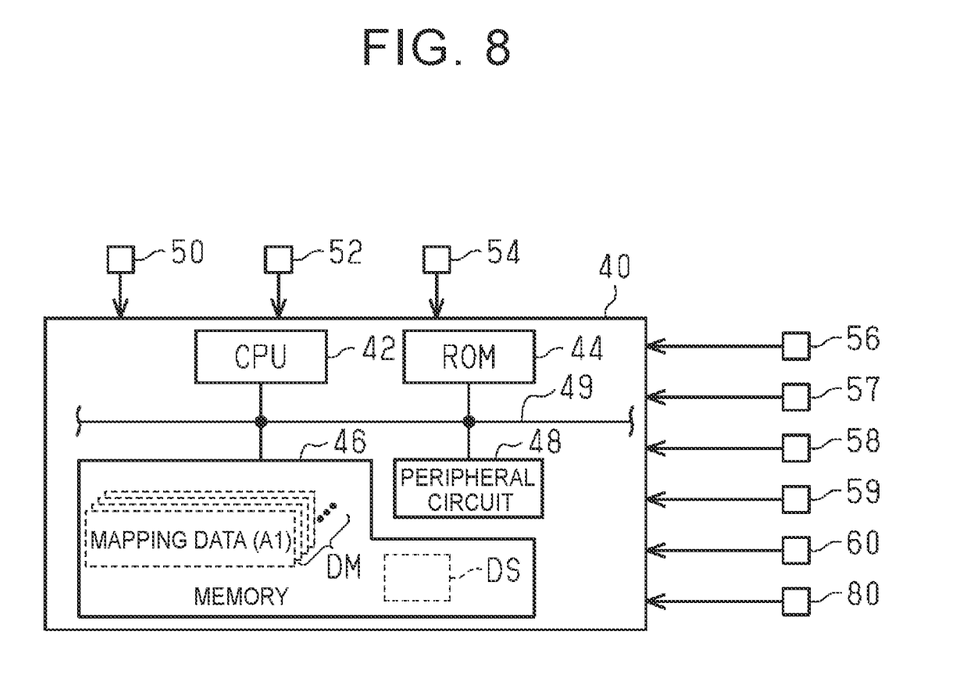
FIG. 8 is a diagram showing a system configuration according to another modified example.

As shown in FIG. 8, the control device 40 can reference not only the oil temperature Toil detected by the oil temperature sensor 56 but also the detected values detected by various sensors included in the vehicle VC. Of the members shown in FIG. 8, the members corresponding to the members shown in FIG. 1 are designated by the same reference signs for convenience, and the description thereof will be omitted.

For example, the control device 40 can reference the wheel speed detected by a wheel speed sensor 57. The control device 40 can calculate the vehicle speed SPD based on the wheel speed. The control device 40 can reference the vibration VB detected by a vibration sensor 58 mounted on the vehicle VC. The control device 40 can reference the noise NZ detected by a noise sensor 59 mounted on the transmission 26.

Further, the control device 40 can also reference the measured value measured by an instrument provided in the vehicle VC or the state quantity that can be acquired from another control device. For example, the control device 40 can reference the integrated mileage OD of the vehicle VC measured by an odometer 60 mounted on the vehicle VC. The control device 40 can also reference the brake pressure PB that can be obtained from a braking control device 80. The braking control device 80 is a control device for the braking device of the vehicle VC. For example, the depressing pressure at which the braking operation member is operated can be referenced as the brake pressure PB. When the braking device is a hydraulic braking device, the master cylinder pressure can also be referenced as the brake pressure PB.

About Time-Series Data

Although the time-series data of the shaft rotation speed Nshaft is illustrated in FIG. 3, FIG. 3 does not limit the number of samples of the shaft rotation speed Nshaft in the specified period.

In the rotation speed calculation process of the above embodiment, an example of calculating the shaft rotation speed Nshaft based on the output signal Sm1 is described. The means for calculating the shaft rotation speed Nshaft, which is the rotation speed of the shaft, is not limited to this. For example, the rotation speed of the shaft provided in the transmission 26 correlates with the vehicle speed SPD. Therefore, the shaft rotation speed Nshaft can also be calculated based on the vehicle speed SPD. It is also possible to employ a sensor for detecting the rotation speed of the shaft to calculate the shaft rotation speed Nshaft based on the value detected by the sensor.

About Feature Quantity as Input Variables

In the process of S102 in the above embodiment, the time-series data of the shaft rotation speed Nshaft is normalized so that the maximum value of the shaft rotation speed Nshaft in the specified period becomes "1" and the minimum value of the shaft rotation speed Nshaft in the specified period becomes "0". The method for normalizing the time-series data of the shaft rotation speed Nshaft is not limited to this. For example, it is conceivable to normalize the time-series data of the shaft rotation speed Nshaft so that the average of the shaft rotation speed Nshaft becomes "0" and the variance becomes "1".

In the process of S103 in the above embodiment, the range from the minimum value to the maximum value of the shaft rotation speed Nshaft in the specified period is divided into five equal ranges and the ranges are classified into five classes. As long as the number of classes is the same in the feature quantity as the input variables, the number of classes set in the process of S103 can be changed as appropriate. In other words, the width of each class can be changed.

In the processes of S102 and S103 in the above embodiment, the time-series data of the shaft rotation speed Nshaft is normalized, and then the normalized data is processed to calculate the normalized feature quantity NFv representing the incidence distribution. The applicable embodiment is not limited to this, and it is also possible to process the time-series data of the shaft rotation speed Nshaft to calculate the feature quantity Fv as the feature quantity representing the incidence distribution, and then calculate the normalized feature quantity NFv based on the feature quantity Fv.

In the above embodiment, the normalized feature quantity NFv is exemplified as the input variables for the mapping defined by the mapping data DM, but the applicable embodiment is not limited to this. For example, the feature quantity Fv, which is the data representing the incidence distribution, may be calculated from the time-series data of the shaft rotation speed Nshaft, and the feature quantity Fv may be used as the input variables. That is, the normalization process is not essential. Even when the width of the classes is not adjusted in the feature quantity Fv, the feature quantity Fv is data obtained by extracting features from the time-series data of the shaft rotation speed Nshaft. By using the feature quantity Fv as the input variables, the state of the shaft can be determined.

In the above embodiment, the data representing the incidence distribution is exemplified as the feature quantity obtained by processing the time-series data of the shaft rotation speed Nshaft, but the applicable embodiment is not limited to this. For example, the distribution of frequency components obtained by fast Fourier transforming the time-series data of the shaft rotation speed Nshaft can be calculated as the feature quantity. By using the feature quantity calculated in this way as the input variables for the mapping, the state of the shaft can be determined based on the feature of the time-series data appearing in the frequency domain. That is, the state of the shaft can be determined based on the features obtained by frequency analysis of the time-series data of the shaft rotation speed Nshaft. In the following, the process of converting the time-series data into the frequency domain by the fast Fourier transform to calculate the feature quantity may be referred to as the frequency analysis process. The feature quantity calculated by the frequency analysis process may be referred to as a frequency feature quantity.

It is also possible to normalize the distribution of frequency components obtained by fast Fourier transforming the time-series data of the shaft rotation speed Nshaft, and use the normalized feature quantity as the input variables for the mapping. That is, in the frequency analysis process, the normalized frequency feature quantity may be calculated. For example, the primary frequency may be calculated from the average of the shaft rotation speed Nshaft in the specified period, and the frequency components may be normalized using the primary frequency as a reference. By normalizing the frequency components, the state of the shaft can be determined based on features obtained by frequency analysis of the time-series data of the shaft rotation speed Nshaft without being affected by the intensity of the frequency components.

When the feature quantity obtained by frequency analysis of the time-series data of the shaft rotation speed Nshaft is used as the input variables, the frequency domain may be divided into a plurality of frequency bands, and the average of the intensities of the frequency components in each frequency band may be used as the intensity in the frequency band. Hereinafter, this process is referred to as a reduction process. By performing the reduction process, the elements of the input variables can be reduced when the feature quantity obtained by frequency analysis of the time-series data of the shaft rotation speed Nshaft is used as the input variables. That is, it is possible to reduce the calculation load in the process of determining whether the shaft is in a vibration state.

Figure 6:
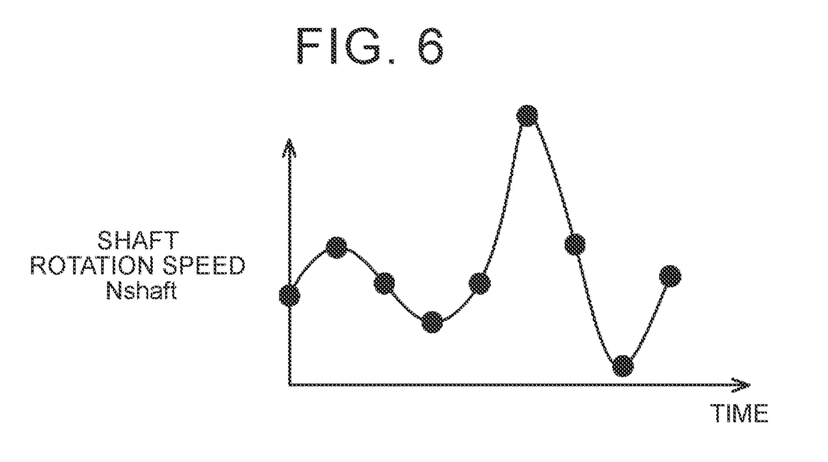
FIG. 6 is a diagram showing time-series data of the rotation speed of the shaft in a torsional vibration state.
Figure 7:
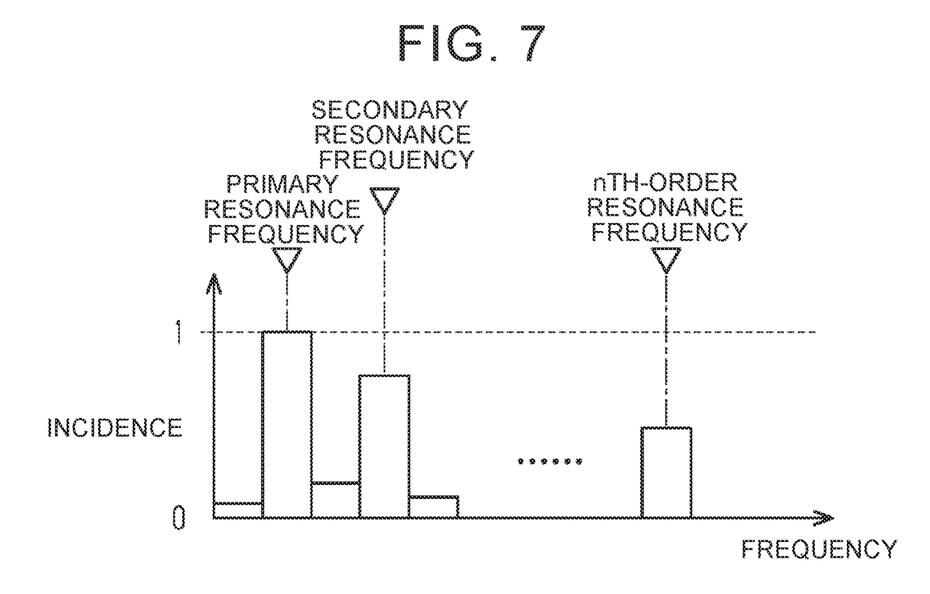
FIG. 7 is a diagram showing feature quantities obtained by processing the time-series data of the rotation speed of the shaft in the torsional vibration state by a process executed by a control device of a modified example.

The processing content of the frequency analysis process for calculating the frequency feature quantity is not limited to the configuration of the above modified example. An example of another frequency analysis process will be described with reference to FIGS. 6 and 7. FIG. 6 illustrates time-series data of the shaft rotation speed Nshaft when the shaft is in a torsional vibration state. As shown in FIG. 6, when the shaft is in a torsional vibration state, the time-series data shows a different transition from the example of divergent vibration shown in the portion (b) in FIG. 3. FIG. 7 illustrates a normalized feature quantity in which the time-series data of the shaft rotation speed Nshaft when the shaft is in a torsional vibration state is processed by the frequency analysis process.

In this frequency analysis process, the CPU 42 first calculates the distribution of frequency components obtained by fast Fourier transforming the time-series data of the shaft rotation speed Nshaft as a feature quantity. Next, the CPU 42 executes a process of dividing the frequency domain into a plurality of frequency bands in the same manner as the reduction process. Execution of this reduction process can be omitted.

Further, the CPU 42 executes a process of normalizing the frequency components so that the intensity of the frequency components at the primary resonance frequency when the vibration mode of the shaft is torsional vibration becomes "1". As the resonance frequency of the shaft, values calculated in advance by an experiment or the like are stored.

As a result, in the example shown in FIG. 7, the maximum value of the intensity is indicated at the primary resonance frequency, and the intensity of the frequency components is normalized to the range of "0" to "1". In the data in the state where the vibration mode is torsional vibration and resonance is generated, the intensity of the frequency components at the resonance frequency when the vibration mode is torsional vibration is relatively higher than the intensity at other frequencies. Therefore, when the data in the state where the torsional vibration is generated is input and the frequency analysis process is executed as in the above configuration, as shown in FIG. 7, the frequency feature quantity that emphasizes the high intensities of the frequency components at the primary, secondary, . . . nth-order resonance frequencies is calculated.

On the other hand, when the time-series data in the state where no torsional vibration is generated is converted into the frequency domain, it can be presumed that the difference between the intensity at the resonance frequency when the vibration mode is torsional vibration and the intensity at other frequencies is not large. Therefore, when the data in the state where the torsional vibration is not generated is processed by the frequency analysis process, it is presumed that the distribution shows a large incidence in the entire frequency domain.

In this way, by calculating the normalized frequency feature quantity based on the intensity of the frequency components at the resonance frequency, the difference in the features that can be extracted from the time-series data of the shaft rotation speed Nshaft depending on whether the shaft vibration mode is torsional vibration or is not torsional vibration can be made remarkable. This makes it easier to distinguish the state of the shaft.

In the above modified example, a process of normalizing the frequency components so that the intensity of the frequency components at the primary resonance frequency becomes "1" is illustrated. Alternatively, the frequency components may be normalized based on the intensity of the frequency components at the secondary resonance frequency or the intensity of the frequency components at the third-order resonance frequency. By normalizing the frequency components so that not only the intensity of the frequency components at the primary resonance frequency but also the intensity of the frequency components at the nth-order resonance frequency becomes "1", it is possible to calculate the normalized feature quantity that emphasizes the high intensity of the frequency components at the resonance frequency as in the above modified example. For example, when normalization is performed so that the intensity of the frequency components at the secondary resonance frequency becomes "1", it is expected that the intensity of the frequency components at the primary resonance frequency will become larger than "1". When a value larger than "1" is calculated in this way, the calculated value may be used, or the value larger than "1" may be treated as "1".

In the above modified example, a process of normalizing the frequency components so that the intensity of the frequency components at the primary resonance frequency becomes "1" is illustrated. However, it is not an essential requirement that the maximum value of the intensity of the frequency components becomes "1". The normalized frequency feature quantity may be calculated with reference to the intensity of the frequency components at the resonance frequency.

Further, in the above modified example, a process of normalizing the frequency components so that the intensity of the frequency components at the resonance frequency when the vibration mode of the shaft is torsional vibration becomes "1" is illustrated. Instead of this, a process of normalizing the frequency components so that the intensity of the frequency components at the resonance frequency when the vibration mode of the shaft is bending vibration becomes "1" may be executed. According to this process, unlike the above modified example, when the time-series data obtained when the vibration mode of the shaft is bending vibration is input, it is possible to calculate the frequency feature quantity that emphasizes the high intensity of the frequency components of the bending vibration at the primary, secondary, . . . nth-order resonance frequencies. Therefore, the difference in the features that can be extracted from the time-series data of the shaft rotation speed Nshaft depending on whether the shaft vibration mode is bending vibration or is not bending vibration can be made remarkable. This makes it easier to distinguish the state of the shaft.

Both the feature quantity representing the incidence distribution such as the normalized feature quantity NFv in the above embodiment and the frequency feature quantity obtained by the frequency analysis process as in the above modified example may be used as the input variables. By inputting a combination of data that has been processed differently into the mapping, it becomes easier to distinguish the features indicated by the time-series data, and thus it can be expected that the accuracy of the determination will be further improved.

In the above modified example, an example is shown in which the feature quantity obtained by frequency analysis of the time-series data of the shaft rotation speed Nshaft is used as the input variables. The applicable embodiment is not limited to this, and the feature quantity obtained by analyzing the time-series data of the shaft rotation speed Nshaft by the rotation order ratio can be used as the input variables.

About Input Variables for Mapping

In the above embodiment, the feature quantity obtained by processing the time-series data of the shaft rotation speed Nshaft is used as the input variables for the mapping. Alternatively, the time-series data of the shaft rotation speed Nshaft may be used as the input variables. For example, the sampling values can be used as the input variables.

In the above embodiment, the average of the oil temperature Toil is used as an input variable for the mapping, but the applicable embodiment is not limited to this. For example, the time-series data of the oil temperature Toil may be used as an input variable.

It is not essential to include the oil temperature Toil in an input variable for the mapping defined by the mapping data DM. The input variables only need to include the time-series data of the shaft rotation speed Nshaft.

The vibration VB may be included in an input variable for the mapping defined by the mapping data DM.

The noise NZ may be included in an input variable for the mapping defined by the mapping data DM.

The integrated mileage OD may be included in an input variable for the mapping defined by the mapping data DM. Instead of the integrated mileage OD, the integrated time while the vehicle VC is starting can also be used. According to this configuration, aging of the shaft, bearings, and the like can be taken into consideration when determining whether an abnormality has occurred in the transmission 26.

The brake pressure PB may be included in an input variable for the mapping defined by the mapping data DM. According to this configuration, when determining whether an abnormality has occurred in the transmission 26, vibration due to deceleration of the vehicle VC, fluctuation of the shaft rotation speed Nshaft due to deceleration of the vehicle VC, and the like can be taken into consideration.

The input variable for the mapping defined by the mapping data DM may include design values indicating the dimensions of each portion of the shaft based on the specifications of the shaft. The design values are the inner diameter of the shaft, the outer diameter of the shaft, the length of the shaft in the axial direction, and the like.

For example, the shaft data DS including the design values indicating the dimensions of each portion of the shaft based on the specifications of the shaft can be stored in the memory 46 as shown in FIG. 8. The CPU 42 can read the values from the shaft data DS and substitute the values into the input variables.

The shaft data DS may include the following data in addition to the specification data based on the specifications of the shaft mounted on the transmission 26. An example of the data included in the shaft data DS is actually measured values indicating the dimensions of each portion of the shaft that are measured after the shaft is manufactured. An example of the data included in the shaft data DS is a value of the fitting tolerance between the shaft and the bearing. An example of the data included in the shaft data DS is the unbalance amount of the shaft. An example of the data included in the shaft data DS is the coaxiality of the shaft supported by the bearing. The unbalance amount and the coaxiality are values measured in advance when the transmission 26 is manufactured.

The actual measured values of the shaft may be included in the input variables for the mapping defined by the mapping data DM.

The unbalance amount may be included in the input variables for the mapping defined by the mapping data DM.

The value of the fitting tolerance may be included in the input variables for the mapping defined by the mapping data DM.

The value of the coaxiality may be included in the input variables for the mapping defined by the mapping data DM.

The magnitude of the torque transmitted by the shaft may be included in the input variables for the mapping defined by the mapping data DM.

About Mapping

The neural network is not limited to a fully connected forward propagation type network. For example, a one-dimensional convolutional neural network may be used. The model learned by machine learning is not limited to the neural network. For example, the state of the shaft may be distinguished using classification by a support vector machine.

In the process of S105, a neural network having one intermediate layer is illustrated, but the applicable embodiment is not limited to this, and the number of intermediate layers may be two or more.

The mapping is not limited to a mapping having the four output variables y(0), y(1), y(2), and y(3) as output variables. If there is another state of the shaft that can be specified based on the feature quantity obtained by processing the time-series data, the state of the shaft can be newly adopted as a state variable and used as an output variable of the mapping.

It may be determined whether an abnormality has occurred in the shaft according to the output variable of the mapping. That is, as the output variable output by the mapping, the probability that an abnormality has occurred in the shaft and the probability that an abnormality has not occurred in the shaft may be calculated.

A plurality of mapping data may be stored in the memory 46 of the vehicle VC as shown in FIG. 8. As an example, three mapping data of the first mapping data DM (A1) to the third mapping data DM (A3) may be stored in the memory 46. The first mapping data DM (A1) is a learned model pre-learned using teacher data based on the normalized feature quantity NFv when the shaft is in a normal state, and teacher data based on the normalized feature quantity NFv when the shaft is in a divergent vibration state. The second mapping data DM (A2) is a learned model pre-learned using teacher data based on the normalized feature quantity NFv when the shaft is in the normal state, and teacher data based on the normalized feature quantity NFv when the shaft is in a torsional vibration state. The third mapping data DM (A3) is a learned model pre-learned using teacher data based on the normalized feature quantity NFv when the shaft is in the normal state, and teacher data based on the normalized feature quantity NFv when the shaft is in a bending vibration state.

When a plurality of mapping data is stored, one type of the mapping data is selected from the plurality of mapping data, and the selected mapping data is used for executing the determination process according to a flow of a series of processes shown in FIG. 2 of the above embodiment. For example, when the first mapping data DM (A1) is selected, the probability that the shaft is in a normal state and the probability that the shaft is in a divergent vibration state are calculated as output variables that indicate the state of the shaft. The CPU 42 determines the state of the shaft based on the calculated maximum value of the output variables. For example, the CPU 42 determines that the shaft is in a normal state when the result shows that the probability that the shaft is in a normal state is 80% or more. On the other hand, the CPU 42 determines that the shaft is in a divergent vibration state when the result shows that the probability that the shaft is in a divergent vibration state is 80% or more. Further, the CPU 42 determines that an abnormality different from a divergent vibration has occurred when the result shows that both the probability that the shaft is in a normal state and the probability that the shaft is in a divergent vibration state are less than 80%.

By repeating the selection of the mapping data and the execution of the determination process until the state of the shaft can be distinguished, it is possible to reduce the calculation load of the processor per process when the processor executes a series of processes involving the determination process, as compared with the case where the state of the shaft is distinguished by one type of mapping data. As a result, when determining whether an abnormality has occurred in the transmission 26, it is possible to suppress an increase in the calculation load of the processor and a decrease in the accuracy of the determination.

In the above modified example, three mapping data of the first mapping data DM (A1) to the third mapping data DM (A3) are illustrated as a plurality of mapping data. Alternatively, two mapping data may be used as appropriate, or four or more mapping data may be adopted as a plurality of mapping data.

About Storage Process

In the above embodiment, the memory for storing the determination result is the same as the memory for storing the mapping data DM, but the present applicable embodiment is not limited to this.

Instead of executing the storage process of storing the determination result of the output variables, a transmission process of transmitting the determination result to the manufacturer of the vehicle VC, the data analysis center, or the like may be executed. It is also possible to execute both the storage process and the transmission process.

About Processor

The processor is not limited to a processor that includes the CPU 42 and the ROM 44 and executes software processing. For example, the processor may include a dedicated hardware circuit (for example, an application specific integrated circuit (ASIC), etc.) that executes hardware processes on at least part of the software processes executed in the above embodiment. That is, the processor only needs to have one of the following configurations (a) to (c):

(a) a configuration including a processing device that executes all of the above processes according to a program and a program storage device such as a ROM for storing the program;

(b) a configuration including a processing device that executes part of the above processes according to a program, a program storage device, and a dedicated hardware circuit that executes the remaining processes; and (c) a configuration including a dedicated hardware circuit that executes all of the above processes.

Here, the above configurations may have a plurality of software processors including a processing device and a program storage device and a plurality of dedicated hardware circuits.

About Vehicle

In the above embodiment, the vehicle VC including the internal combustion engine 10, the first motor generator 22, and the second motor generator 24 is exemplified. As long as the vehicle is provided with a transmission for transmitting power by a shaft, the control device 40 can be applied, and the state of the shaft can be determined in the same manner as in the above embodiment.

What is claimed is:

1. An abnormality determination device mounted on a vehicle provided with a transmission configured to transmit power by rotation of a shaft, the abnormality determination device comprising:
   a memory configured to store mapping data that is data that defines mapping learned by machine learning, the mapping being a mapping of which an input variable is a variable indicating time-series data of a rotation speed of the shaft and of which an output variable is a plurality of state variables indicating a state of the shaft, the state of the shaft including a first state where the shaft is in a normal state, a second state where the shaft is in a divergent vibration state, a third state where the shaft is in a torsional vibration state, and a fourth state is in a bending vibration state, and
   the state variables including four state variables indicating that the state of the shaft is the first state, the second state, the third state, and the fourth state, respectively;
   a display configured to notify a state of the transmission; and
   a processor that is connected to and controls an internal combustion engine, a motor generator and an inverter of the vehicle, wherein
   the processor is configured to execute
      an acquisition process of acquiring the variable indicating the time-series data and using the variable as a value of the input variable,
      an input process of inputting the input variable to the mapping,
      a determination process of determining whether an abnormality has occurred in the transmission by determining the state of the shaft based on a maximum value of the four state variables output from the mapping,
      a storage process of storing the results of the determining the state of the shaft in the memory, and
      a notification process of operating the display based on the state of the shaft stored in the memory.

2. The abnormality determination device according to claim 1, wherein:
   the processor is configured to execute a feature quantity calculation process of calculating a feature quantity obtained by processing the time-series data;
   the acquisition process is a process of acquiring the feature quantity and using the feature quantity as the value of the input variable; and
   the feature quantity calculation process is a process of dividing values of the rotation speed constituting the time-series data into classes in accordance with a magnitude of the rotation speed, and calculating an incidence for each of the classes as the feature quantity.

3. The abnormality determination device according to claim 2, wherein the feature quantity calculation process includes a process of normalizing the time-series data such that a maximum value of the rotation speed becomes "1" and a minimum value of the rotation speed becomes "0".

4. The abnormality determination device according to claim 2, wherein:
   the feature quantity is a time feature quantity;
   the feature quantity calculation process is an incidence analysis process of calculating the time feature quantity;
   the processor is configured to execute a frequency analysis process of calculating, as a frequency feature quantity, a distribution of frequency components obtained by fast Fourier transforming the time-series data; and
   in the acquisition process, the time feature quantity and the frequency feature quantity obtained by processing the time-series data are acquired and used as the value of the input variable.

5. The abnormality determination device according to claim 1, wherein:
   the processor is configured to execute a frequency analysis process of calculating a frequency feature quantity obtained by processing the time-series data;
   the acquisition process is a process of acquiring the frequency feature quantity and using the frequency feature quantity as the value of the input variable; and
   the frequency analysis process is a process of calculating, as the frequency feature quantity, a distribution of frequency components obtained by fast Fourier transforming the time-series data.

6. The abnormality determination device according to claim 4, wherein the frequency analysis process includes a process of calculating a primary frequency based on an average of the rotation speed in the time-series data and normalizing the frequency components with the primary frequency as a reference.

7. The abnormality determination device according to claim 4, wherein the frequency analysis process includes a process of normalizing the frequency components such that an intensity of the frequency components at a primary resonance frequency when a vibration mode of the shaft is torsional vibration becomes "1".

8. The abnormality determination device according to claim 4, wherein the frequency analysis process includes a process of normalizing the frequency components such that an intensity of the frequency components at a primary resonance frequency when a vibration mode of the shaft is bending vibration becomes "1".

9. The abnormality determination device according to claim 1, wherein the time-series data is calculated based on a detection signal of a rotation speed sensor configured to detect the rotation speed of the shaft.

10. The abnormality determination device according to claim 1, wherein the time-series data is calculated based on a vehicle speed of the vehicle.

* * * * *